United States Patent
Moynot et al.

(10) Patent No.: US 8,441,163 B2
(45) Date of Patent: May 14, 2013

(54) ROTATING ELECTRIC MACHINE WITH HOMOPOLAR DOUBLE EXCITATION

(75) Inventors: Victor Moynot, Meudon (FR); Franck Chabot, Meudon (FR); Michel Lecrivain, Ivry (FR); Mohamed Gabsi, Cachan (FR); Sami Hlioui, Arcueil (FR)

(73) Assignee: Peugeot Citroen Automobiles SA (FR)

( * ) Notice: Subject to any disclaimer, the term of this patent is extended or adjusted under 35 U.S.C. 154(b) by 107 days.

(21) Appl. No.: 13/125,038

(22) PCT Filed: Nov. 9, 2009

(86) PCT No.: PCT/FR2009/052152
§ 371 (c)(1),
(2), (4) Date: Apr. 19, 2011

(87) PCT Pub. No.: WO2010/052439
PCT Pub. Date: May 14, 2010

(65) Prior Publication Data
US 2011/0193441 A1    Aug. 11, 2011

(30) Foreign Application Priority Data
Nov. 10, 2008  (FR) ..................................... 08 57636

(51) Int. Cl.
*H02K 1/27* (2006.01)
(52) U.S. Cl.
USPC ................................. 310/156.53; 310/156.54
(58) Field of Classification Search ............. 310/156.53, 310/156.54
See application file for complete search history.

(56) References Cited

U.S. PATENT DOCUMENTS

| | | | |
|---|---|---|---|
| 6,462,449 B1 * | 10/2002 | Lucidarme et al. ...... | 310/156.56 |
| 6,541,887 B2 * | 4/2003 | Kawamura ..................... | 310/190 |
| 6,900,570 B2 * | 5/2005 | Ifrim ............................. | 310/190 |
| 6,972,504 B1 * | 12/2005 | Hsu ........................... | 310/156.56 |
| 7,755,243 B2 * | 7/2010 | Mizutani et al. ........ | 310/216.007 |
| 2008/0036331 A1 * | 2/2008 | Mizutani et al. ............. | 310/269 |
| 2010/0071971 A1 | 3/2010 | Tatematsu et al. | |

FOREIGN PATENT DOCUMENTS

| | | |
|---|---|---|
| DE | 2109569 A1 | 9/1972 |
| EP | 1416617 A | 5/2004 |
| FR | 2786956 A | 6/2000 |
| FR | 2846483 A1 | 10/2002 |
| JP | 2008228534 A | 9/2008 |
| WO | 01 42649 A2 | 6/2001 |

* cited by examiner

*Primary Examiner* — Dang Le
(74) *Attorney, Agent, or Firm* — Polster, Lieder, Woodruff & Lucchesi, L.C.

(57) ABSTRACT

The present invention essentially relates to an electric machine (1.1) with homopolar double excitation, comprising a rotor particularly consisting of a central portion (51) made of a solid magnetic material and a laminated annular portion (53) located at the periphery of the solid portion. In addition, the rotor comprises permanent magnets (54), the magnetization thereof being radially oriented relative to the axis (33) of the rotor (31), and separated from one another such that the double excitation flow generated by the field coils (38, 39) can enter the rotor (31, 67) via the flanges (48, 49) of the rotor, and come back out via the spaces between the magnets (54), or vice-versa.

8 Claims, 3 Drawing Sheets

ROTATING ELECTRIC MACHINE WITH HOMOPOLAR DOUBLE EXCITATION

CROSS-REFERENCE TO RELATED APPLICATIONS

The present application is the US national stage under 35 U.S.C. §371 of International Application No. PCT/FR2009/052152 which claims the priority of French application 0857636 filed on Nov. 10, 2008.

BACKGROUND

The present invention relates to a rotating electric machine with homopolar double excitation. The goal of the invention is in particular to facilitate the passage of the double excitation flux inside the electric machine.

The invention finds a particularly advantageous, but not exclusive, application in synchronous electric machines intended to be used with electric or hybrid vehicles combining the use of a combustion engine and an electric machine.

Rotating electrical machines with double excitation are disclosed in the French patent application number FR-2846483.

As shown in FIG. 1 herein, such machines 1 have a stator 3 and a rotor 5 separated from each other by a functional air gap 6.

More precisely, stator 3 comprises an annular lamellar magnetic core 7 provided with a stator coil 8 and annular coils 9, 10 generating a double excitation flux. Core 7 and stator coils 9, 10 are arranged in a solid magnetic ring 11 in contact with the exterior surface of core 7. This ring 11 comprises at each extremity a rim 13, 14 facing the rotor 5.

Rotor 5 contains a body 15 comprising permanent magnets 18 with tangentially oriented magnetization (perpendicular to the rotor radius) and separated from each other by teeth 19 (FIG. 2) composed of lamellar plates which channel the flux generated by magnets 18 and direct it to the air gap 6.

Rotor 5 further comprises annular flanges 21, 22 positioned on opposite sides of body 15, each having peripheral portions defining, with the radial extremity rims 13 and 14 of the stator ring 11, air gaps for return of the magnetic flux. The flanges 21 and 22 are connected to teeth 19 in an alternating manner. Each tooth 19 comprises an extremity facing towards flange 21 and an extremity facing towards flange 22.

With such an arrangement the excitation coils 9, 10 can modulate the flux of magnets 18 by creating a flux, called double excitation flux, which circulates through paths 24 and 25 passing through stator ring 11, a radial extremity rim 13, 14, a flange 21, 22, the laminations 19 of the rotor, first in an axial direction along the active length D of the machine, then in a radial direction, then through the magnetic core 7 of the stator, closing the loop with ring 11.

Given that the excitation coils 9, 10 have an annular shape and that rotor 5 is made of lamellar material, the reluctance seen by the double excitation flux is high, which penalizes the yield of the machine 1. In order to minimize this reluctance, it was first contemplated to replace this lamellar rotor 5 by a solid rotor, but the core losses would then be excessive. Therefore, it seemed advantageous to combine in the rotor, according to the invention, a lamellar circuit in the periphery (to minimize the losses) and another solid circuit (to facilitate the passage of flux).

However, in the case of a rotor with tangential magnetization, the practical execution of the invention is difficult, in particular because of reasons of mechanical strength, construction complexity, or small improvement in flux circulation.

We also know double excitation electric machines with radial magnets, like those described in U.S. Pat. No. 5,682,073 to Mizuno, using a single excitation coil positioned in the middle of the stator. In this case, it is possible to create a lamellar and solid rotor as in the invention. However, if the rotor according to the Mizuno patent is combined with the stator according to French App. No. 2846483, the obtained electric machine will not function correctly because there would be a magnetic short circuit penalizing the correct circulation of the flux in the machine.

BRIEF SUMMARY

Briefly, an electrical machine structure is provided that facilitates the circulation of the flux along the length D of the machine and minimizes the core losses generated at the periphery of the rotor.

To this end, the rotor is comprised of a central part made of solid magnetic material and an annular part made of lamellar material situated in the periphery of the solid part. Furthermore, the rotor contains permanent magnets with radially oriented magnetization relative to the axis of the rotor and separated from each other in such a manner that the double excitation flux generated by the excitation coils can enter the rotor through the flanges of the rotor and exit through the spaces between magnets, or vice versa.

The claimed invention relates therefore to a rotating electric machine with homopolar double excitation, characterized in that it comprises:

a stator comprising a central core and two excitation coils positioned on both sides of the core generating a double excitation flux, and a rotor comprising:
  a central solid part with isotropic magnetic behavior facilitating the circulation of double excitation flux according to the rotor axis,
  an annular part of lamellar material installed around the central solid part, and
  permanent magnets with radially oriented magnetization relative to the rotor axis, these magnets have the same polarization, and two consecutive or adjacent magnets are separated by a magnetic space to allow for the circulation of the double excitation flux in the rotor between magnets.

According to an embodiment, each permanent magnet occupies approximately half of the polar pitch.

According to an embodiment, the permanent magnets are installed in the periphery of the rotor to maximize the passage section of the double excitation flux in the solid central part.

According to an embodiment, the permanent magnets are built in the interior of the annular part.

According to an embodiment, the permanent magnets are mounted in the periphery of the annular part.

According to an embodiment, the geometrical orientation of the magnets is longitudinal relative to the axis of the rotor.

According to an embodiment, the permanent magnets are each formed by an assembly of U-shaped magnets.

According to an embodiment, the stator further comprises a stator coil wound around an annular magnetic core, and at least one magnetic ring in contact with the exterior surface of the annular magnetic core, the magnetic ring comprises in each extremity a radial extremity rim.

According to an embodiment, the rotor further comprises two annular flanges of magnetic material arranged on both sides of the central part and coaxially according to the rotor axis, these flanges each comprise an axial peripheral portion defining with the radial extremity rims of the ring return air gaps for the magnetic flux.

BRIEF DESCRIPTION OF THE DRAWINGS

The electrical machine will be better understood by reading the following description and by examining the accompanying figures. These figures are provided as non-limiting illustrations of the invention. They show.

Identical elements retain the same reference from one figure to another.

DETAILED DESCRIPTION

Figure 1:
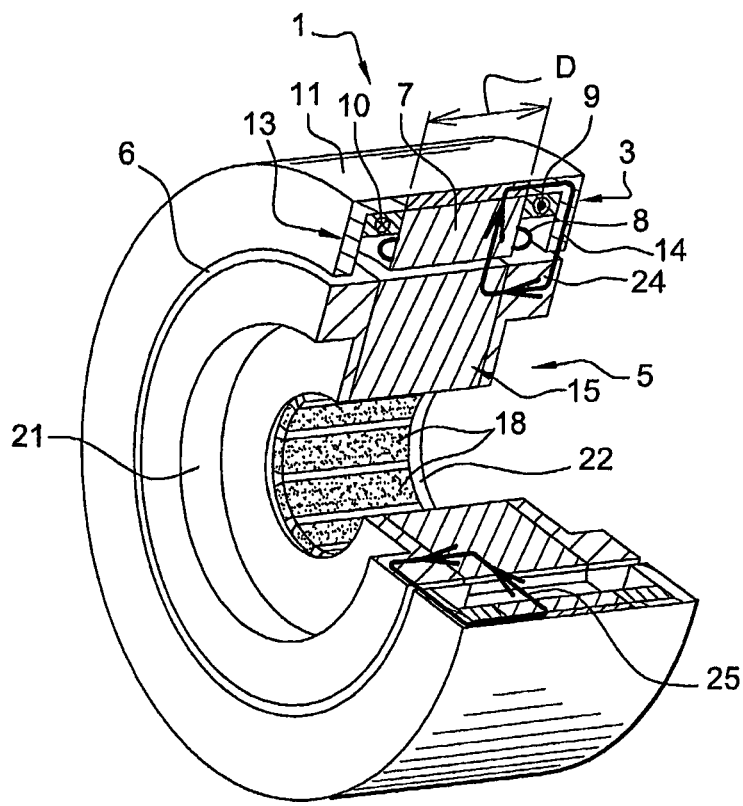
FIG. 1 (already described) is a truncated perspective view of an electric machine with double excitation according to the state of the art.
Figure 2:
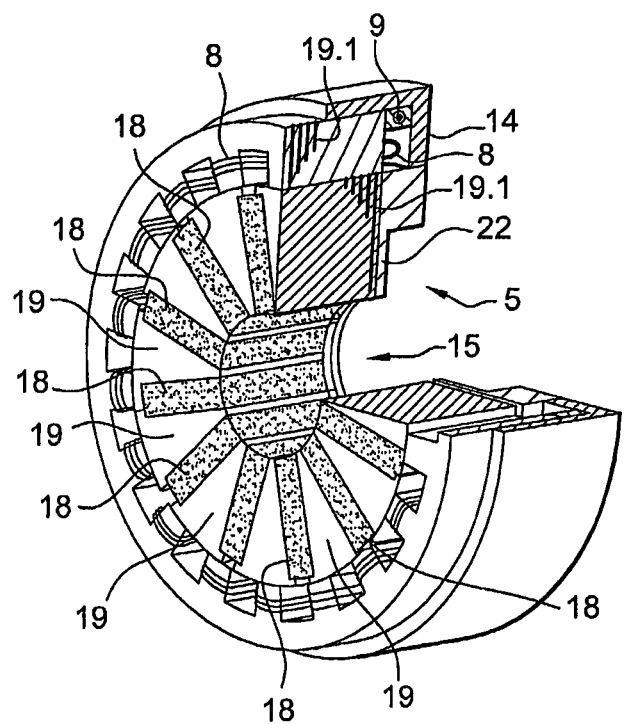
FIG. 2 (already described) is a perspective view of the machine of FIG. 1 with one of the flanges removed to show the direction of the rotor core laminations.
Figure 3:
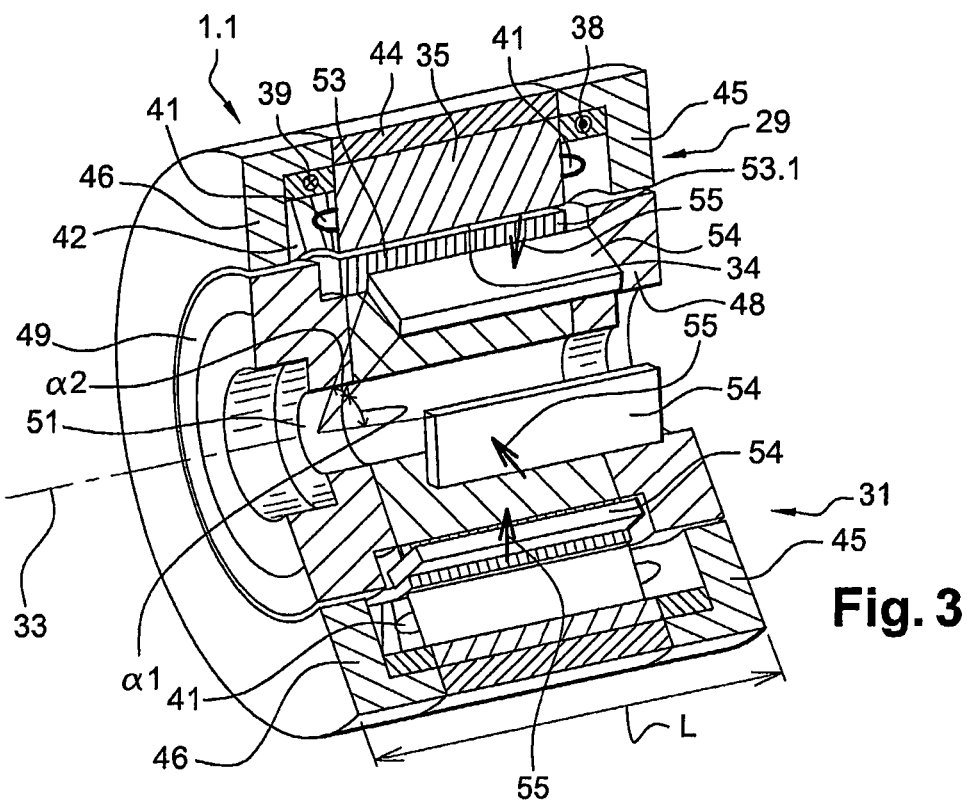
FIG. 3 is a truncated perspective view of an electric machine with homopolar double excitation according to the claimed invention.
Figure 4:
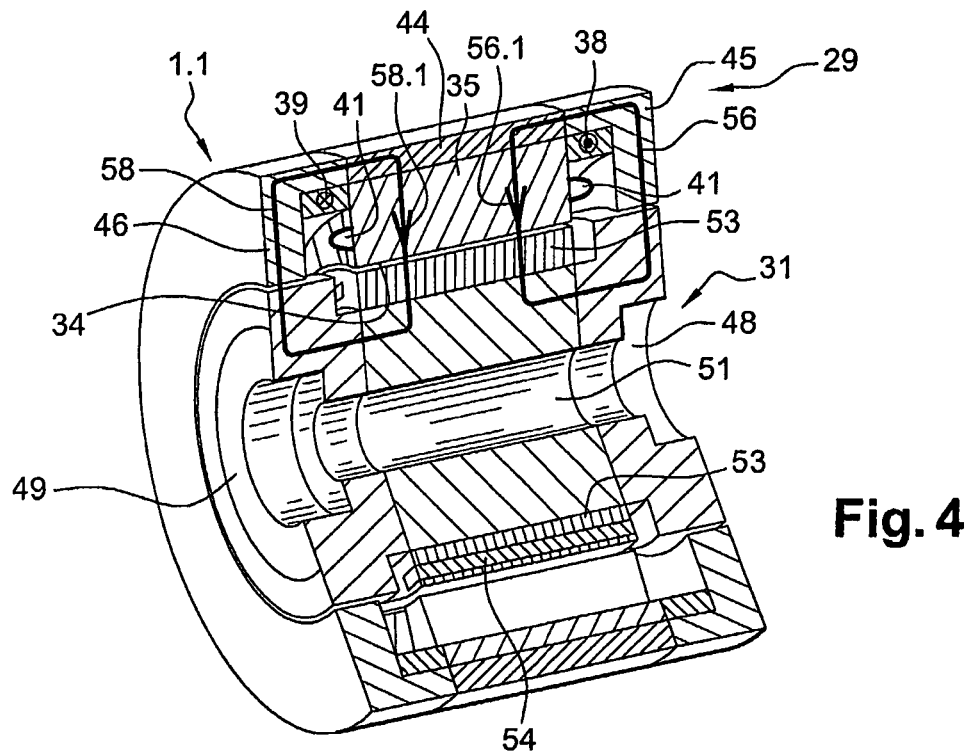
FIG. 4 is a truncated perspective view of the machine of FIG. 3 showing the double excitation flux generated by the excitation coils of the stator.

FIGS. 3 and 4 show a rotating electric machine 1.1 with homopolar double excitation comprising a stator 29 and a rotor 31 with an axis 33. The stator 29 and rotor 31 are separated by a functional air gap 34.

The stator 29 comprises an annular core 35 made of magnetic laminations, on both sides of which are arranged annular excitation coils 38, 39. The currents circulate through these excitation coils 38, 39 in opposite directions.

A stator coil 41, surrounded by the excitation coils 38, 39, is wound in a conventional manner around core 35 which presents for this purpose an interior surface formed by teeth 42.

The assembly of core 35 and coils 38, 39 is housed in an exterior magnetic ring 44 which is in contact with an exterior surface of the magnetic core 35. This solid ring 44 comprises lateral extremity rims 45, 46 facing towards rotor 31.

The rotor 31 comprises two annular flanges 48, 49 of solid magnetic material arranged coaxially with the axis 33. These flanges 48, 49 each comprise an axial peripheral portion defining, with the radial extremity rims 45 and 46 of ring 44, return air gaps for the magnetic flux.

A central part 51 of solid (non-lamellar) magnetic material is arranged between the flanges 48, 49 and coaxially with the axis 33 of rotor 31. Due to its solid character, the central part 51 has an isotropic magnetic behavior, which facilitates the circulation of flux along the axis 33 of the rotor generated by the double excitation. In the center of part 51 there is an opening intended for receiving a shaft (not shown) on which rotor 31 is mounted.

Rotor 31 also comprises an annular part 53 of lamellar magnetic material which limits core losses. This annular part 53 is installed around part 51. The lamellar plates 53.1 of part 53 are by preference oriented radially relative to the rotor axis 33. In one embodiment, rotor 31 has a radius Re of approximately 125 mm; the annular part 53 has a thickness of approximately 16 mm, the overall length L of machine 1 is approximately 100 mm.

Figure 6A:
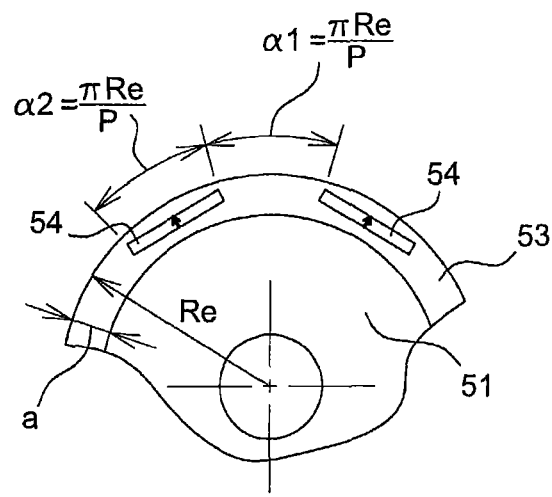
FIGS. 6a and b are schematic views of varying positions of the permanent magnets of the rotor.

Permanent magnets 54, with the same polarity and generating a magnetic field radial relative to the rotor axis 33, are installed inside rotor 31. Here, magnets 54 extend geometrically according to the extension of machine 1.1 and generate a magnetic field indicated by arrows 55 going from the exterior of rotor 31 towards the center of rotor 31. In a variant, the direction of the magnetic field of these magnets 54 is reversed and goes from the center of rotor 31 towards the exterior of rotor 31, as shown in FIG. 6a.

Magnets 54 are installed in the periphery of rotor 31 to maximize the passage section of the double excitation flux in the central solid part 51. Here, the magnets 54 are built in the interior of annular part 53 which is provided with cavities for this purpose. These magnets 54 are separated from each other by a magnetic space through which the double excitation flux circulates inside rotor 31 between magnets 54. "Magnetic space" is understood to be a space which is a good conductor of magnetic flux consisting for instance of a solid magnetic material and/or as here a lamellar magnetic material.

By preference, each magnet 54 occupies approximately half of the polar pitch, one polar pitch being equal to the perimeter of the rotor 31 divided by the number of pole pairs P. As shown in FIG. 6a, the angular free space $\alpha 1$ between two successive or adjacent magnets 54 is approximately equal to the angular space $\alpha 2$ occupied by one magnet 54, these angles $\alpha 1$ and $\alpha 2$ are equal to the product of the radius Re of rotor 31 and the number $\pi$ divided by the number of pole pairs p of machine 1.1.

In a variant, magnets 54 are mounted, by gluing for instance on the periphery of the annular part 53. In a variant, magnets 54 are installed in the hollows of slots made in the periphery of the annular part 53.

Figure 6B:
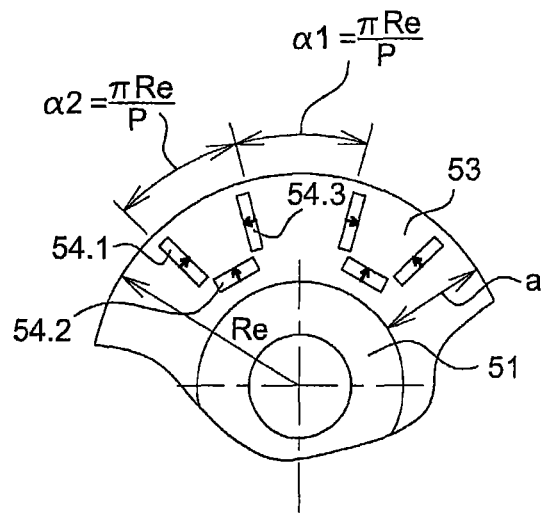

In a variant, as shown in FIG. 6B, magnets 54 are replaced by U-shaped assemblies of permanent magnets 54.1-54.3. The field created by each of these magnet assemblies is radial relative to the axis 33. The direction of this field is either from the center of rotor 31 towards the exterior of rotor 31, or from the exterior towards the center of rotor 31. The U shape has the advantage of increasing the flux generated by magnets 54; however this increased flux is obtained to the detriment of the space reserved for the solid part 51 (therefore to the detriment of the flux circulation generated by the double excitation coils 38, 39).

As indicated in FIG. 4, when machine 1.1 is running, the flux generated by double excitation coil 38 circulates through a first magnetic circuit 56 according to which the flux travels through the ring 44, the core 35, the functional air gap 34, the annular part 53 between magnets 54, the central part 51, the flange 48, the rim 45 to close the loop through ring 44. The direction of the flux inside the circuit 56 is indicated by arrow 56.1.

The flux generated by the excitation coil 39 circulates through a second magnetic circuit 58 according to which the flux passes through the ring 44, the central part 51, the flange 49, the rim 46 to close the loop through ring 44. The direction of the flux inside circuit 58 is indicated by arrow 58.1.

The presence of permanent magnets 54 with magnetic permeability close to 1 (making it an element equivalent to an air gap) prevents the double excitation flux from acting on the poles where the magnets are housed.

Figure 5:
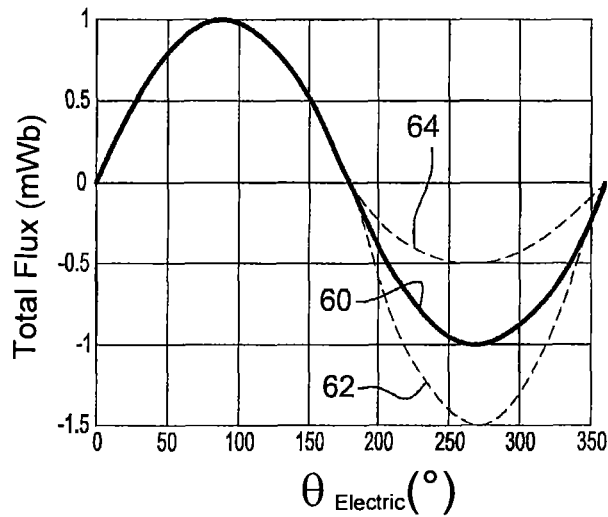
FIG. 5 is a graphic representation of the flux variation of the machine according to FIGS. 3 and 4 as a function of the electric angle for different electrical supply currents of the excitation coils.

FIG. 5 shows the evolution of the total flux observed for the machine 1.1 expressed in milliWeber (mWb) as a function of the electric angle θ expressed in degrees. Curve 60 shows that, without the double excitation flux, the permanent magnets 54 generate an alternating flux.

By supplying the excitation coils 38, 39 in one direction or another, the value of the flux under one pole of machine 1.1 will vary. When coils 38, 39 generate a flux which is added to the flux of permanent coils 54 (flux increase), curve 62 is obtained, while when the coils generate a flux which is deducted from the flux of the permanent magnets 54 (flux decrease), curve 64 is obtained.

The invention claimed is:

1. A rotating electric machine with homopolar double excitation, wherein the electric machine comprises:
    a stator comprising a central core, a stator coil, and two excitation coils positioned on opposite sides of said core generating a double excitation flux, said excitation coils surrounding said stator coil; and
    a rotor comprising:
        a central solid part having isotropic magnetic behavior to facilitate the circulation of the double excitation flux relative to the axis of the rotor,
        an annular part of lamellar material installed around the central solid part, and
        permanent magnets with magnetization oriented radially relative to the axis of the rotor; said permanent magnets each being formed by a U-shaped assembly of magnets; said magnets having the same polarization, and wherein two consecutive magnets are separated by a magnetic space to allow circulation of the double excitation flux in the rotor between the magnets.

2. The electric machine according to claim 1, wherein each permanent magnet occupies approximately half of a polar pitch.

3. The electric machine according to claim 1 wherein the permanent magnets are installed in the periphery of the rotor to maximize the magnetic space in the central solid part.

4. The electric machine according to claim 1 wherein the permanent magnets are built in the interior of the annular part.

5. The electric machine according to claim 1 wherein the permanent magnets are mounted in the periphery of the annular part.

6. The electric machine according to claim 1 wherein the geometric orientation of the magnets is longitudinal relative to the axis of the rotor.

7. The electric machine according to claim 1 wherein the stator further comprises a stator coil wound around an annular magnetic core, and at least one magnetic ring in contact with the exterior surface of the magnetic annular core, said magnetic ring comprising in each extremity a radial extremity rim.

8. The electric machine according to claim 7, wherein the rotor further comprises two annular flanges of magnetic material arranged on opposite sides of the central part and coaxially with the axis of the rotor; the flanges each comprising an axial peripheral portion defining with the radial extremity rims of ring return air gaps for the magnetic flux.

* * * * *